(12) United States Patent
Bumiller

(10) Patent No.: US 7,711,362 B2
(45) Date of Patent: May 4, 2010

(54) SYSTEM AND METHOD FOR PERSONAL IDENTIFICATION NUMBER MESSAGING

(75) Inventor: George Baldwin Bumiller, Ramsey, NJ (US)

(73) Assignee: Research In Motion Limited, Waterloo, Ontario (CA)

( * ) Notice: Subject to any disclaimer, the term of this patent is extended or adjusted under 35 U.S.C. 154(b) by 849 days.

(21) Appl. No.: 11/391,946

(22) Filed: Mar. 29, 2006

(65) Prior Publication Data

US 2006/0223530 A1 Oct. 5, 2006

Related U.S. Application Data

(60) Provisional application No. 60/665,960, filed on Mar. 29, 2005.

(51) Int. Cl.
*H04W 4/00* (2009.01)
(52) U.S. Cl. .................... 455/435.1; 370/270
(58) Field of Classification Search .............. 455/435.1, 455/13.1
See application file for complete search history.

(56) References Cited

U.S. PATENT DOCUMENTS

| 6,219,694 | B1 | 4/2001 | Lazaridis et al. | |
|---|---|---|---|---|
| 6,424,828 | B1 * | 7/2002 | Collins et al. | 455/412.1 |
| 2003/0095521 | A1 * | 5/2003 | Haller et al. | 370/338 |
| 2005/0278448 | A1 | 12/2005 | Mazor | |

FOREIGN PATENT DOCUMENTS

EP 1075155 A1 2/2001

OTHER PUBLICATIONS

International Search Report and Written Opinion for Corresponding PCT Patent Application No. PCT/CA2006/000466 dated Jun. 22, 2006 (cited references previously submitted).

Research in Motion Ltd. "Blackberry Wireless Handheld from Nextel User Guide", Nov. 7, 2003 [Retrieved May 1, 2006], Retrieved from Internet: http://www.nextel.com/en/support/guides/interactive/blackberry/content_text/blackberyy7150_ug.ug.pdf, Published in Canada.

Research in Motion Ltd. "Onset Demos METAmessage Emergency Communication Capabilities For BlackBerry At Government Security Expo (GOVSEC)" Jul. 28, 2004, Retrieved from: http://www.rim.net/news/partner/2004/pr-28_07_2004.shtml.

Onset Technology. "METAmessage for Wireless, Emergency Communications White Paper Version 4.2" Oct. 22, 2004, 10 pages.

(Continued)

*Primary Examiner*—Rafael Pérez-Gutiérrez
*Assistant Examiner*—Marcos Batista
(74) *Attorney, Agent, or Firm*—Stephen A. Bucchianeri; Brij K. Agarwal; Eckert Seamans Cherin & Mellott, LLC

(57) ABSTRACT

A relay site associated with a wireless network can send messages between mobile devices associated with the wireless network without having to transmit the messages to a host system. The messages include PIN messages and each of the mobile devices has a PIN address. The relay site includes a relay server for controlling the operation of the relay site, and sending the PIN messages between the mobile devices. The relay site also includes a relay data store having PIN information for users associated with the mobile devices. The relay server can access the relay data store to allow users that use the mobile devices to query the relay data store for PIN information of other users.

22 Claims, 10 Drawing Sheets

OTHER PUBLICATIONS

Stewart, Sinclair and Bloom, Richard. "BlackBerry battle chills Bay St. gossips" Jan. 7, 2005, Friday's Globe and Mail. Published by Bell Globemedia Publishing Inc.

Onset Technology, "METAmessage for Wireless, Capabilities for Continuity of Operations (COOP) and Emergency Response (ER) White Paper Version 4.1" Apr. 13, 2004, 10 pages.

Onset Technology. "METAmessage for Wireless, Technical White Paper Version 4.1" Aug. 12, 2003, 23 pages.

Onset Technology. "METAmessage for Wireless, Emergency Data Access Gateway", 2003 advertising, 2 pages.

* cited by examiner

| 332 | 334 | 336 | 338 | 340 | 342 | 344 | 346 |
|---|---|---|---|---|---|---|---|
| E-mail Address | PIN Address | PIN date Changed | Subscription Information | SIM Info | IMEI | Name | Location |
| ... | ... | ... | ... | ... | ... | ... | ... |

SYSTEM AND METHOD FOR PERSONAL IDENTIFICATION NUMBER MESSAGING

REFERENCE TO RELATED APPLICATION

This application claims priority from U.S. Provisional Patent Application Ser. No. 60/665,960 filed on Mar. 29, 2005.

FIELD

Wireless communication devices and associated networks, systems and methods are described with respect to Personal Identification Number (PIN) messaging.

BACKGROUND

Wireless communication devices (hereafter referred to as mobile devices) allow for different forms of communication. For example, a mobile device may generally send and receive voice and data communications. More specifically, with regards to data communications, a mobile device can send and receive electronic mail ("e-mail"), text ("SMS") and personal identification number ("PIN") messages. E-mail and PIN messages are similar since they can both include a combination of text and/or graphics and can be sent to one or more recipients. However, e-mail and PIN messages are different in terms of how recipients are indicated and how these messages are transmitted.

For instance, a recipient in an e-mail message is specified using an e-mail address that can include a portion of a recipient's name. A recipient in a PIN message is specified using a PIN address, which is generally a number such as an 8 digit hexadecimal number (i.e. "200212F5"), for example. Both of these addresses are associated with the recipient's mobile device so that messages can be properly sent to the correct mobile device.

When an e-mail message is sent, it is typically received by a mail server such as Microsoft Exchange™, for example. An associated message management server then acts as a conduit between the mail server and the mobile device. When an e-mail message is received at the mail server, the message management server will be notified that an e-mail message has arrived, will retrieve the e-mail message and then send it to the mobile device(s) that are associated with the recipient e-mail address(es).

PIN messages are generally not transmitted by the message management server, as is required for e-mail messages. Therefore, if one of the mail or mail management servers is not functioning, PIN messages still allow users of mobile devices to communicate with one another, which is important in emergency situations. However, PIN information is usually contained centrally at an enterprise or host system. Further, since PIN addresses are unique numbers that bear no relation to the user of a mobile device, unless there is an up-to-date PIN address for a recipient in the address book of the sender's mobile device, when one or more components of a corporate network are disabled in a conventional system, it is not possible to access PIN information and hence it will be difficult to send PIN messages.

BRIEF DESCRIPTION OF THE DRAWINGS

For a better understanding of the various embodiments described herein, and to show more clearly how they may be carried into effect, reference will now be made, by way of example only, to the accompanying drawings which show at least one exemplary embodiment and in which:

FIG. 5 is a block diagram of an exemplary embodiment of various fields of a relay database that is used by the relay server of FIG. 4;

DETAILED DESCRIPTION

Figure 1:
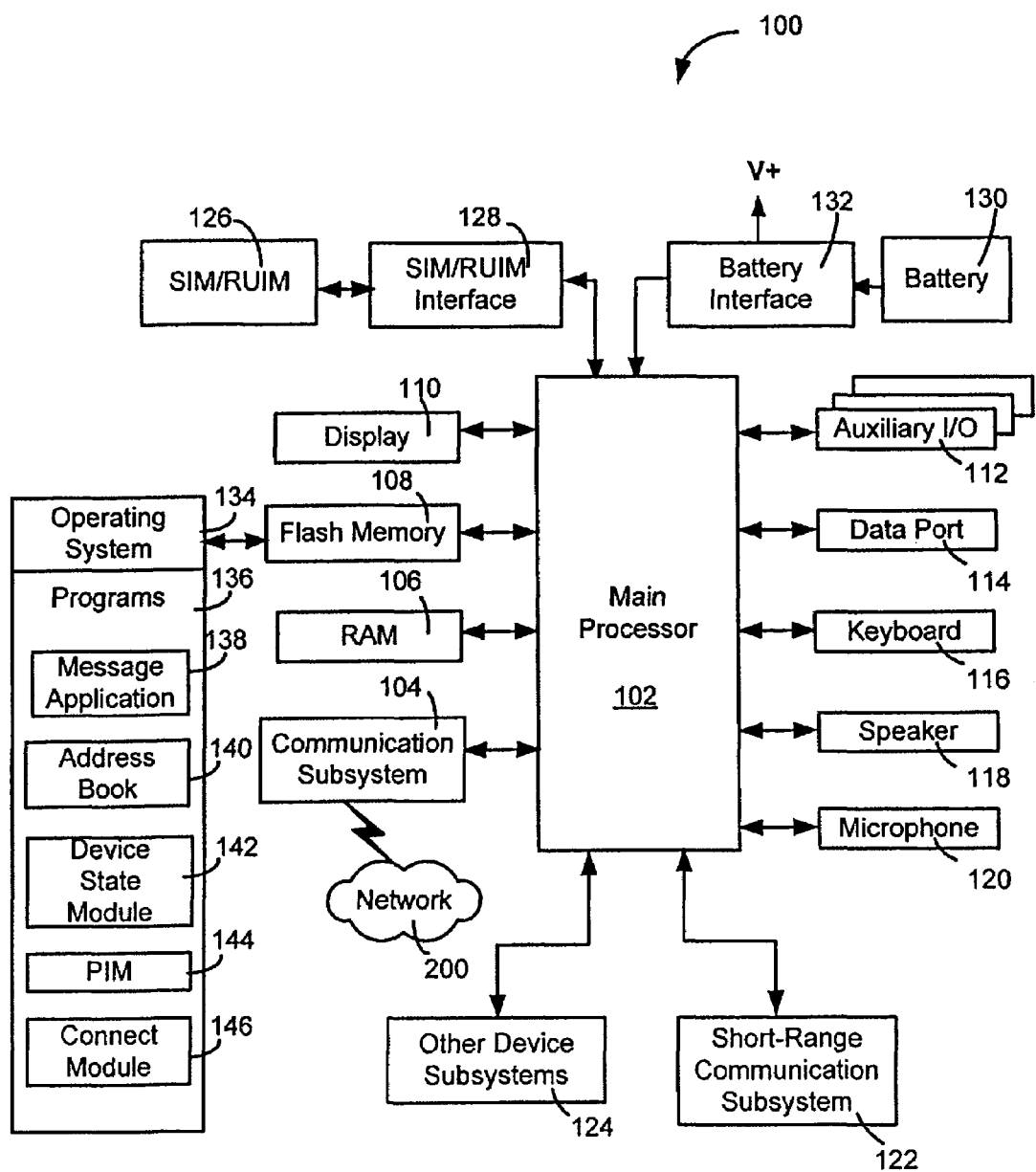
FIG. 1 is a block diagram of an exemplary embodiment of a mobile device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The embodiments described herein generally relate to certain components of a wireless network, along with associated methods, for allowing mobile devices to communicate with one another. The mobile devices are two-way communication devices with advanced data communication capabilities including the capability to communicate with other mobile devices or computer systems through a wireless network of transceiver stations. The mobile device may also have the capability for voice communications. Depending on the functionality provided by the mobile device, it may be a wireless data communication device (with or without telephony capabilities), a two-way pager, a cellular telephone with data messaging capabilities, a cellular smart-phone, a wireless organizer, a personal digital assistant, a handheld wireless communication device, a wirelessly enabled notebook computer, or a wireless Internet appliance. To aid the reader in understanding the structure of the mobile device and how it communicates with other devices and host systems, reference will now be made to FIGS. 1 through 4.

Referring first to FIG. 1, shown therein is a block diagram of an exemplary embodiment of a mobile device 100. The mobile device 100 includes a number of components such as a main processor 102 that controls the overall operation of the mobile device 100. Communication functions, including data and voice communications, are performed through a communication subsystem 104. The communication subsystem 104 receives messages from, and sends messages to, a wireless network 200. In this exemplary embodiment of the mobile device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with mobile device 100 is a GSM/GPRS wireless network in one exemplary implementation, other wireless networks may also be associated with the mobile device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include IEEE-802.11, Mobitex™ and DataTAC™ network communication systems. Examples of other voice-centric data networks include Personal Communication Systems (PCS) networks like GSM and Time Division Multiple Access (TDMA) systems. Other network communication technologies that may be employed include, for example, Integrated Digital Enhanced Network (iDEN™), Evolution-Data Optimized (EV-DO), and High Speed Downlink Packet Access (HSDPA).

The main processor 102 may also interact with additional subsystems such as a Random Access Memory (RAM) 106, a flash memory 108, a display 110, an auxiliary input/output (I/O) subsystem 112, a data port 114, a keyboard 116, a speaker 118, a microphone 120, a short-range communication subsystem 122 and other devices subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 can use a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services may include: web browsing and messaging such as e-mail, voice mail, Short Message Service (SMS), Personal Identification Number (PIN) messaging, and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 can include some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The mobile device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may be used to provide power to the mobile device 100. The mobile device 100 may, in the absence of receiving power from a charged battery, receive power from an AC adapter.

The mobile device 100 also includes an operating system 134 and software components 136 to 144 which are described in more detail below. The operating system 134 and the software components 136 to 144 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 144, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, will normally be installed on the mobile device 100 during its manufacture. Other software applications include a message application 138 and a local address book application 140. The message application 138 can be any suitable software program that allows a user of the mobile device 100 to send and receive electronic messages. Various alternatives exist for the message application 138 as is well known to those skilled in the art. Messages that have been sent or received by the user are typically stored in the flash memory 108 of the mobile device 100 or some other suitable storage element in the mobile device 100. In at least some embodiments, some of the sent and received messages may be stored remotely from the device 100 such as in a data store of an associated host system that the mobile device 100 communicates with.

The local address book application 140 provides information for a list of contacts for the user. For a given contact in the address book 140, the information can include the name, phone number, work address and e-mail address of the contact, among other information. In some cases, the address book 140 can be provided by the message application 138.

The software applications can further include a device state module 142, a Personal Information Manager (PIM) 144, and other suitable modules (not shown). The device state module 142 provides persistence, i.e. the device state module 140 ensures that important device data is stored in persistent memory, such as the flash memory 108, so that the data is not lost when the mobile device 100 is turned off or loses power.

The PIM 144 includes functionality for organizing and managing data items of interest to the user, such as, but not limited to, e-mail, contacts, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

The mobile device 100 also includes a connect module 146 that implements the communication protocols that are required for the mobile device 100 to communicate with the wireless infrastructure and any host system, such as an enterprise system, that the mobile device 100 is authorized to interface with. Examples of a wireless infrastructure and a host system are given in FIGS. 3 and 4, which are described in more detail below. The connect module 146 includes a set of APIs that can be integrated with the mobile device 100 to allow the mobile device 100 to use any number of services associated with the host system. The connect module 146 allows the mobile device 100 to establish an end-to-end secure, authenticated communication pipe with the host system.

Other types of software applications can also be installed on the mobile device 100. These software applications can be third party applications, which are added after the manufacture of the mobile device 100. Examples of third party applications include games, calculators, utilities, etc.

The additional applications can be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences for the mobile device 100, or services associated with the mobile device 100, through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

The short-range communication subsystem 122 provides for communication between the mobile device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, a PIN message, or information associated with a web page download will be processed by the communication subsystem 104 typically under the control of the main processor 102. The main processor 102 will then process the received signal for output to the display 110 or alternatively to the auxiliary I/O subsystem 112. A subscriber may also compose data items, such as e-mail or PIN messages, for example, using the keyboard 116 in conjunction with the display 110 and possibly the auxiliary I/O subsystem 112. The auxiliary I/O subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 by the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although a voice or an audio signal output is accomplished primarily through the speaker 118, the display 110 can also be used to provide additional information such as the identity of a calling party, duration of a voice call, or other voice call related information.

Figure 2:
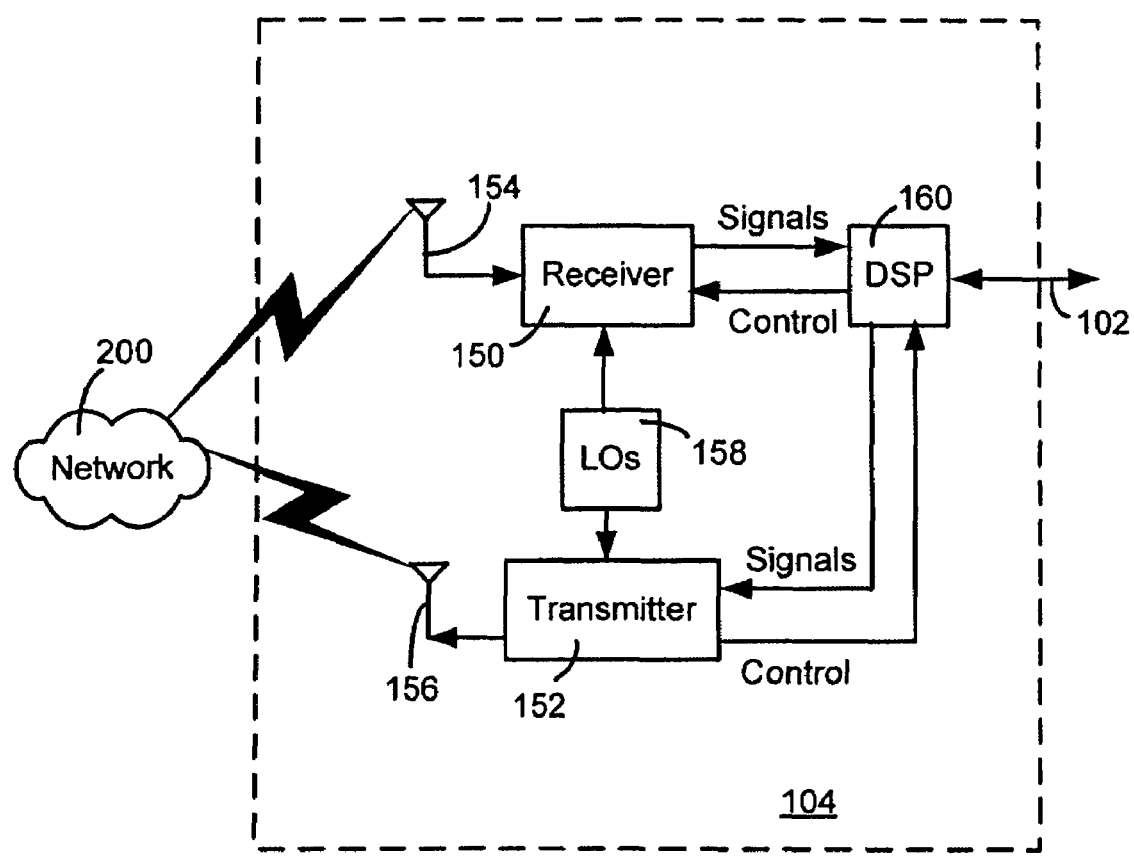
FIG. 2 is a block diagram of an exemplary embodiment of a communication subsystem component of the mobile device of FIG. 1.

Referring now to FIG. 2, an exemplary block diagram of the communication subsystem component 104 is shown. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the mobile device 100 is intended to operate. Thus, it should be understood that the design illustrated in FIG. 2 serves only as one example.

Signals received by the antenna 154 from the wireless network 200 are input to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the processing module 160. In a similar manner, signals to be transmitted are processed, including modulation and encoding, by the processing module 160. These processed signals are input to the transmitter 152 for digital-to-analog (D/A)

conversion, frequency up conversion, filtering, amplification and transmission over the wireless network 200 via the antenna 156. The processing module 160 not only processes communication signals, but can also provide receiver and transmitter control. For example, the gains applied to the received signals in the receiver 150 and the transmitted signals in the transmitter 152 may be adaptively controlled through automatic gain control algorithms implemented in the processing module 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is sending data to the wireless network 200 and is otherwise turned off to conserve resources. Similarly, the receiver 150 is periodically turned off to conserve power until it is needed to receive signals or information (if at all) during designated time periods.

Figure 3:
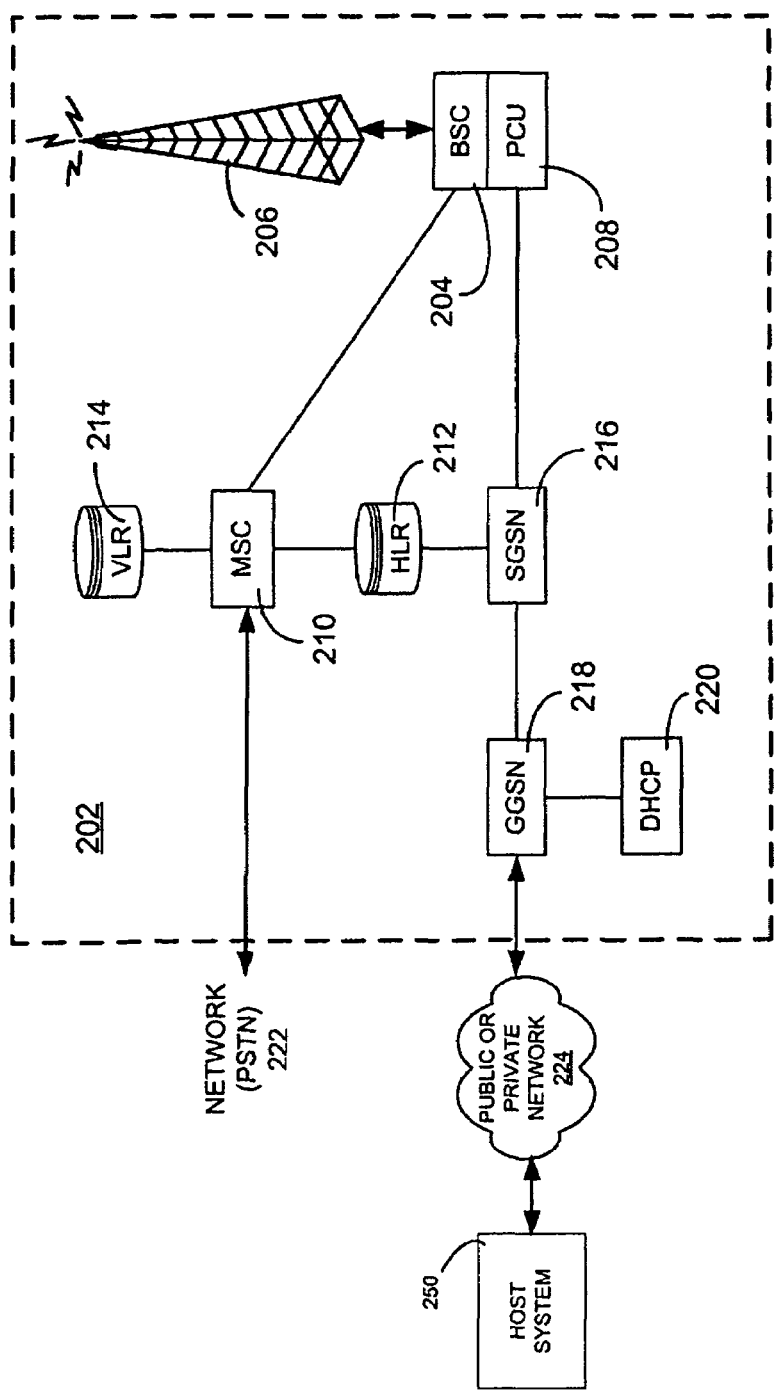
FIG. 3 is a block diagram of an exemplary embodiment of a node in a wireless network.

Referring now to FIG. 3, shown therein is a block diagram of an exemplary implementation of a node 202 of the wireless network 200. In practice, the wireless network 200 comprises one or more nodes 202. In conjunction with the connect module 146, the mobile device 100 can communicate with the node 202 within the wireless network 200. In this exemplary embodiment, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the wireless network 200.

In a GSM network, the MSC 210 is coupled to the BSC 204 and to a landline network, such as a Public Switched Telephone Network (PSTN) 222 to satisfy circuit switched requirements. The connection through the PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, the BSC 204 also contains a Packet Control Unit (PCU) 208 that connects to the SGSN 216 to control segmentation, radio channel allocation and to satisfy packet switched requirements. To track the location of the mobile device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell" within the wireless network 200. The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from mobile devices within its cell. Communication protocols and parameters may vary between different nodes. For example, one node may employ a different modulation scheme and operate at different frequencies than other nodes.

For every mobile device 100 registered with a specific wireless network 200, permanent configuration data such as a user profile is stored in the HLR 212. The HLR 212 also contains location information for each registered mobile device and can be queried to determine the current location of a mobile device within the fixed transceiver equipment's cell. The MSC 210 is responsible for a group of location areas and stores the data of the mobile devices currently in its area of responsibility in the VLR 214. Further the VLR 214 also contains information on mobile devices that are visiting other networks. The information in the VLR 214 includes part of the permanent mobile device data transmitted from the HLR 212 to the VLR 214 for faster access. By moving additional information from a remote HLR node to the VLR 214, the amount of traffic between these nodes can be reduced so that voice and data services can be provided with faster response times while at the same time requiring less use of computing resources.

The SGSN 216 and GGSN 218 are elements added for GPRS support; namely packet switched data support within GSM. The SGSN 216 and MSC 210 have similar responsibilities within the wireless network 200 and can keep track of the location of each mobile device 100. The SGSN 216 also performs security functions and access control for data traffic on the wireless network 200. The GGSN 218 provides internetworking connections with external packet switched networks and connects to one or more of the SGSN's 216 via an Internet Protocol (IP) backbone network operated within the wireless network 200. During normal operations, a given mobile device 100 must perform a "GPRS Attach" to acquire an IP address and to access data services. This requirement is not present in circuit switched voice channels since Integrated Services Digital Network (ISDN) addresses are used for routing incoming and outgoing calls. Currently, all GPRS capable networks use private, dynamically assigned IP addresses, thus requiring the DHCP server 220 to be connected to the GGSN 218. There are many mechanisms for dynamic IP assignment, including using a combination of a Remote Authentication Dial-In User Service (RADIUS) server and a DHCP server. Once the GPRS Attach operation is complete, a logical connection is established from the mobile device 100, through the PCU 208 and the SGSN 216, to an Access Point Node (APN) within the GGSN 218. The APN represents a logical end of an IP tunnel that can either access direct Internet compatible services or private network connections. The APN also represents a security mechanism for the wireless network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (Ipsec) connections used with Virtual Private Networks (VPN). These tunnels are also referred to as Packet Data Protocol (PDP) contexts and there are a number of these available in the wireless network 200. To maximize use of the PDP contexts, the wireless network 200 will run an idle timer for each PDP context to determine if there is a lack of activity. When the mobile device 100 is not using its PDP context, the PDP context can be de-allocated and the IP address returned to the IP address pool managed by the DHCP server 220.

The embodiments described herein relate generally to methods and system components to facilitate the sending and receiving of PIN messages between mobile devices. Each mobile device 100 generally has an associated PIN address that is assigned at the time of manufacture and will often be embedded in a non-volatile memory onboard the mobile device 100. However, there can also be some situations in which the PIN address can be assigned at a later date to the mobile device 100.

Similar to an e-mail address, a PIN address is unique and, as it is associated with a particular mobile device 100, may be used as a way to identify one or more destination mobile devices to which a PIN message is to be sent. The mobile devices 100 will allow for a PIN address to be entered into one or more address destination fields such as the "TO" address field. The method by which PIN message communication is handled by the wireless network 200 is discussed in more detail below.

Figure 4:
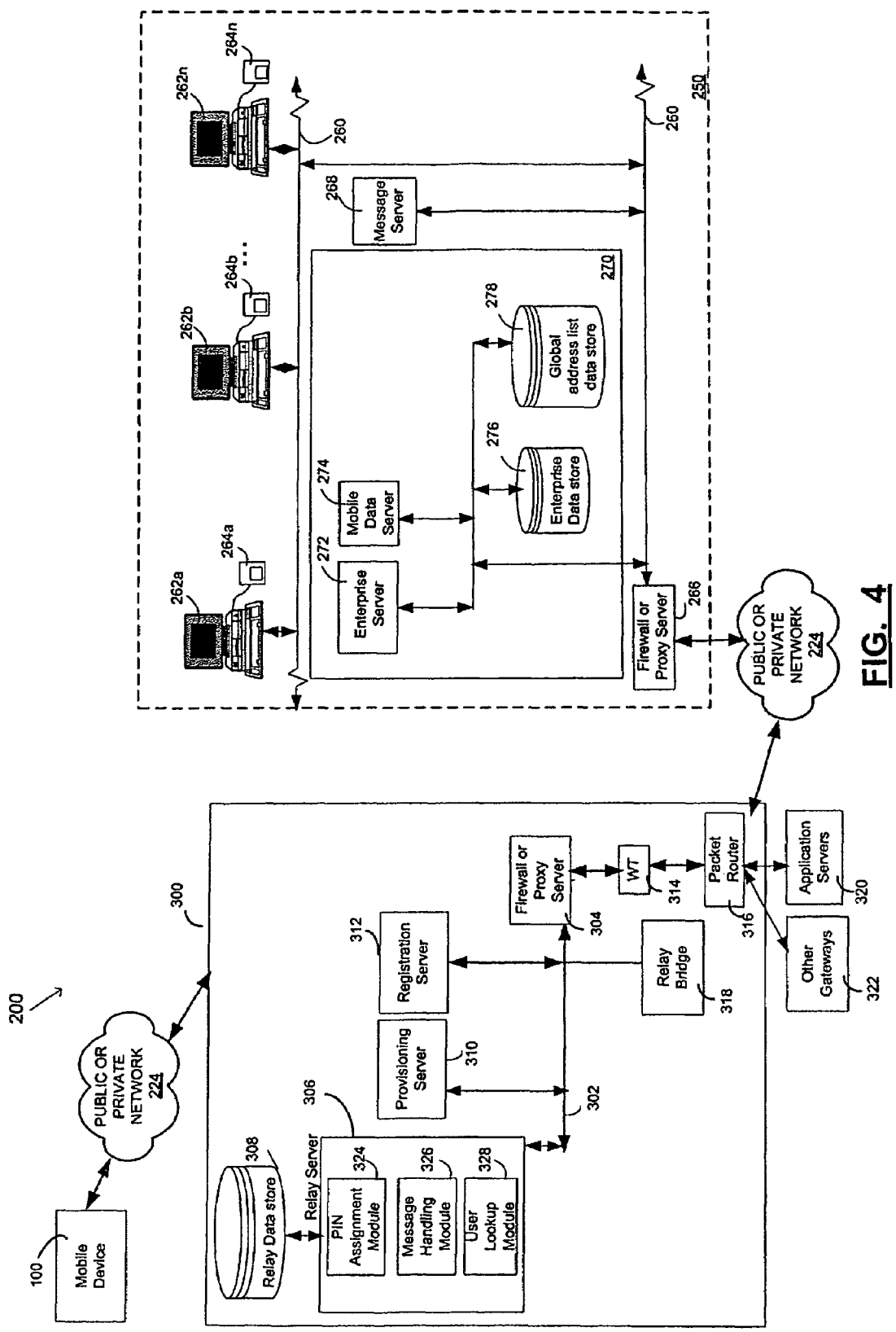
FIG. 4 is a block diagram of an exemplary embodiment of a portion of a wireless network having a host system and a relay site.

Referring now to FIG. 4, shown therein is an exemplary embodiment of a portion of the wireless network 200 having a host system 250 and a relay site 300. The host system 250 is typically a corporate office network or some other network, but in other alternative implementations may be a home office computer or some other private system. In this example, the host system 250 is an organization's network and the user of the mobile device 100 may have some sort of affiliation to the organization such as being an employee. The relay site 300 is a component of the wireless network 200 and can be used to route messages between several associated mobile devices 100. There can be several relay sites 300 (a relay site can also be referred to as a relay node). Typically, several mobile devices communicate wirelessly with the host system 250 through the relay site 300 and other nodes 202 of the wireless network 200. The other nodes 202 can be contained within the network 224. A carrier provider can provide the network 224.

The host system 250 includes a number of network components connected to each other by appropriate network connections 260 such as LAN connections, for example. The network connections 260 will generally be wired connections but may also include wireless devices and associated methods as is commonly known to those skilled in the art. The host system 250 includes at least one user desktop or laptop computer 262a-262n connected to the network 260 along with an accompanying cradle 264a-264n for the user's mobile device 100. A given cradle 264a may be coupled to the corresponding user computer 262a by a serial or a Universal Serial Bus (USB) or Bluetooth connection, for example. It should be understood that each user computer 262a-262n need not be equipped with an accompanying cradle 264 and that one cradle 264a may be shared amongst several of the user computers 262a-264n. The cradle 264a facilitates the loading of information (e.g. PIM data, private symmetric encryption keys to facilitate secure communications, etc.) from the user computer 262a to the mobile device 100, and may be particularly useful for bulk information updates often performed in initializing or updating the mobile device 100 for use. The information downloaded to the mobile device 100 may include certificates used in the exchange of messages. Alternatively, the cradles 264a-264n may not be required as long as the connection between the user computer and the mobile device can still be accomplished (i.e. this can be done in a wireless fashion).

It will be understood by persons skilled in the art that the user computers 262a-262n will typically also be connected to other peripheral devices, such as printers, etc. which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this exemplary configuration. More generally, the host system 250 may represent a smaller part of a larger network (not shown) of the organization, and may comprise different components and/or be arranged in different topologies than that shown in the exemplary embodiment of FIG. 4.

To facilitate the operation of the mobile device 100 and the wireless communication of messages and message-related data between the mobile device 100 and components of the host system 250, or between various mobile devices, a firewall or proxy server 266, one or more message servers 268 and a number of wireless communication support components 270 can be provided. In some implementations, the wireless communication support components 270 can include an enterprise server 272, and a mobile data server 274. The support components 270 can also include an enterprise data store 276, and a global address list data store 278. Other components may also be included as is well known to those skilled in the art. Further, in some implementations, the data stores 276 and 278 can be combined and/or be part of any one of the servers.

In this exemplary embodiment, "in the field", the mobile device 100 communicates with the host system 250 through one of the relay sites 300 of the wireless network 200, and the shared network infrastructure 224 which may be a carrier network or the public Internet provided by a service provider, for example. Access to the host system 250 through the shared network infrastructure 224 may be provided through one or more routers (not shown). In addition, the computing devices of the host system 250 will typically operate from behind the firewall or proxy server 266. The proxy server 266 provides a secure node and a wireless internet gateway for the host system 250. The proxy server 266 intelligently routes data to the correct destination server within the host system 250.

In some implementations, the host system 250 may include one or more wireless VPN routers (not shown) to facilitate data exchange between the host system 250 and the mobile device 100. The wireless VPN router allows a VPN connection to be established directly through a specific portion of the wireless network 200 to the mobile device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the mobile device 100 in this alternative implementation.

In some instances, the message server 268 initially receives messages that are intended for a user of the mobile device 100. Such messages can originate from a number of sources.

For instance, a message may be sent by a sender from the computer 262b within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

Each user in the organization that has been set up to send and receive messages is typically associated with a user account managed by the message server 268. Some exemplary implementations of the message server 268 include Microsoft Exchange™ server, Lotus Domino™ server, Novell Groupwise™ server, or another suitable mail server installed in a corporate environment. In some implementations, the host system 250 may comprise multiple message servers 268. The message server 268 may also be adapted to provide additional functions beyond message management, including the management of data associated with calendars and task lists, for example.

When messages are received by the message server 268, they are typically stored in a data store associated with the message server 268. In at least some embodiments, the data store may be a separate hardware unit, such as the enterprise data store 276 or 278, that the message server 268 communicates with. Messages can be subsequently retrieved and delivered to users by accessing the message server 268. For instance, an e-mail client application operating on a user's computer 262a may request the e-mail messages associated with that user's account stored on the data store associated with the message server 268. These messages are then retrieved from the data store and stored locally on the computer 262a.

When operating the mobile device 100, the user may wish to have e-mail messages retrieved for delivery to the mobile device 100. The message application 136 operating on the mobile device 100 may also request messages associated with the user's account from the message server 268. The message application 136 may be configured (either by the user or by an administrator, possibly in accordance with an organization's information technology (IT) policy) to make this request at the direction of the user, at some pre-defined time interval, or upon the occurrence of some pre-defined event. In some implementations, the mobile device 100 is assigned its own e-mail address, and messages addressed specifically to the mobile device 100 are automatically redirected to the mobile device 100 when received by the message server 268.

The message server 268 will also be associated with a data store 278 that includes user-specific information such as a global address list. The global address list will contain contact information for all of the contacts or users associated with the host system 250. The contact information can include the name, e-mail addresses, and PIN address for a particular user that is part of the host system 250. The global address list will also contain information with respect to one or more address lists. An address list allows for a message to be sent by specifying one e-mail address in the e-mail address field that actually represents multiple recipients.

The enterprise server 272 can be used to specifically provide support for the management of messages, such as e-mail messages, that are to be handled by mobile devices. Generally, while messages are still stored on the message server 268, the enterprise server 272 can be used to control when, if, and how messages are sent to the mobile device 100. For example, the enterprise server 272 may monitor the user's "mailbox" (e.g. the message store associated with the user's account on the message server 268) for new e-mail messages, and apply user-definable filters to new messages to determine if and how the messages are relayed to the user's mobile device 100. The enterprise server 272 may also compress and encrypt new messages (e.g. using an encryption technique such as Data Encryption Standard (DES), Triple DES, or Advanced Encryption Standard (AES)) and push them to the mobile device 100 via the shared network infrastructure 224 and the wireless network 200.

The enterprise server 272 also facilitates the handling of messages composed on the mobile device 100, which are sent to the message server 268 for subsequent delivery. The enterprise server 272 may receive messages composed on the mobile device 100 (e.g. encrypted using Triple DES), decrypt and decompress the composed messages, re-format the composed messages if desired so that they will appear to have originated from the user's computer 262a, and re-route the composed messages to the message server 268 for delivery. Accordingly, the enterprise server 272 will also have access to records for users associated with the mobile devices 100 that correspond to the host system 250. This information can be stored in the enterprise data stores 276 or 278 and can indicate the contact information (specified above) as well as other information.

Certain properties or restrictions associated with messages that are to be sent to or from one of the mobile devices 100 can be defined (e.g. by an administrator in accordance with IT policy) and enforced by the enterprise server 272. These may include, for example, whether the mobile device 100 may receive encrypted and/or signed messages, minimum encryption key sizes, whether outgoing messages must be encrypted and/or signed, and whether copies of all secure messages sent from the mobile device 100 are to be sent to a pre-defined copy address, for example.

The enterprise server 272 may also be adapted to provide other control functions, such as only pushing certain message information or pre-defined portions (e.g. "blocks") of a message stored on the message server 268 to the mobile device 100. For example, in some cases, when a message is initially retrieved by the mobile device 100 from the message server 268, the enterprise server 272 may push only the first part of a message to the mobile device 100, with the part being of a pre-defined size (e.g. 2 KB). The user can then request that more of the message be delivered in similar-sized blocks by the enterprise server 272 to the mobile device 100, possibly up to a maximum pre-defined message size. Accordingly, the enterprise server 272 facilitates better control over the type and amount of data that is communicated to the mobile device 100, and can help to minimize potential waste of bandwidth or other resources.

The mobile data server 274 encompasses any other server that can store information that is relevant to the corporation, and can be used to obtain relevant information. The mobile data server 274 may include, but is not limited to, databases, online data document repositories, customer relationship management (CRM) systems, enterprise resource planning (ERP) applications, security information, internet information, and the like.

The enterprise server 272 can also provide information for a list of contacts for the user in a similar fashion as the address book on the mobile device 100. Accordingly, for a given contact, the enterprise server 272 can include the name, phone number, work address and e-mail address of the contact, among other information. The enterprise server 272 can obtain this information from one of the data stores 276 and 278.

It should be understood by persons skilled in the art that the enterprise server 272, the mobile data server 274, and the data stores 276 and 278 do not need to be implemented on separate physical servers within the host system 250. For example, some or all of the functions associated with the enterprise server 272 and the mobile data server 274 can be integrated into one server in the host system 250. Furthermore, the data stores 276 and 278 can be implemented in one data store. Alternatively, the host system 250 may comprise multiple enterprise servers 272, particularly in variant implementations where a large number of mobile devices need to be supported.

The relay site 300 provides several major functional services including, but not limited to, routing services, authentication services and roaming services. Generally, the relay site 300 routes messages between the mobile devices 100 and the host network 250 as well as directly between the mobile devices 100 in some instances. In particular, the relay site 300 can identify destination information in messages sent from the mobile devices and route the messages to the appropriate system component or carrier network provider. The relay site 250 can provide connectivity between the mobile devices and various network services, regardless of the geographic location of the mobile devices and the respective carrier network providers. The relay site 300 can also exchange voice, data and/or control operations with the host system 250. The relay site 300 can also be connected with other relay sites (not shown).

The relay site 300 generally includes a firewall or proxy server 304, a network connection 302 (such as a LAN connection for example), a relay server 306, and a relay data store 308. The network connection 302 may be a wired or wireless connection as is commonly known by those skilled in the art. In some implementations, the relay site 300 can also include a provisioning server 310 and a registration server 312. In other implementations, the provisioning server 310 and the registration server 312 can be implemented remotely from, but still be connected to, the relay site 300 and the registration server 312 can be associated with the enterprise server 272 or an internet server (not shown and discussed further below). The relay site 300 further includes a Wireless Transport (WT) interface 314 and a packet router 316. The firewall or proxy server 304, the WT interface 314, and the packet router 316 can be collectively referred to as a network interface that connects the relay site 300 to various components of the wireless network 200 such as the public or private network 224. The relay site 300 can also include a relay bridge 318.

It should be understood by those skilled in the art that only a subset of the components of the relay site 300 are shown for ease of description, and that the relay site 300 may include additional components. For instance, the relay site 300 may also include monitoring components that control and monitor the routing functions performed by the relay site 300. The relay site 300 can also include additional modules that interface with the relay data store 308 to provide functionality and operation that is independent of the host system 250. The relay site 300 can also include various components for ensuring that messages are properly sent to, and received from, the host system 250. The relay site 300 can also include components to provide storing and forwarding functionality of messages when a particular mobile device is out of coverage or has been switched off and thus messages cannot be immediately sent to the mobile device. These messages can be stored in the relay data store 308.

The relay server 306 provides the main functionality for the relay site 300. The relay server 306 routes messages transmitted between the mobile devices 100 and the host system 250. To facilitate PIN message routing, the relay server 306 can query the relay data store 308 to identify the recipient mobile device that matches a recipient PIN address. In some case, information pertaining to the MSISDN (Mobile Station International ISDN) or IMSI (International Mobile Subscriber Identity) number associated with a mobile device can be used to facilitate PIN message routing. The relay data store 308, as explained in more detail below, can include the MSISDN or IMSI information with respect to a mobile device 100. The relay data store 308 can also include subscription information for a particular user, as well as other information relating to the mobile device 100. In some implementations, the relay data store 308 can also store PIN messages that have been sent to devices associated with the relay site 300.

The relay server 306 can include a PIN assignment module 324, a message handling module 326 and a user lookup module 328. The PIN assignment module 324 is optional and can be used to assign PINs to mobile devices 100 depending on certain situations. The user lookup module 328 can be used to lookup a user's information including PIN information by searching the relay data store 308.

The message handling module 326 ensures that e-mail, PIN messages and "pseudo-PIN" messages are transmitted in a proper fashion. More specifically, the message handling module 326 distinguishes or discriminates between the messages based on message type (i.e. e-mail message, PIN message or pseudo-PIN message) and takes the appropriate action based on message type. A pseudo-PIN message is a PIN message that includes at least one e-mail address in an address field.

For instance, for an e-mail message, the message handling module 326 sends the e-mail message to the host system 250. For a PIN message, the message handling module 326 can send the PIN message to the mobile devices associated with the intended recipients of the PIN message. In some implementations, the message handling module 326 may verify the PIN addresses in the PIN message address fields. For a pseudo-PIN message, the message handling module 326 can convert the pseudo-PIN message to a standard PIN message and send the standard PIN message to the intended recipients.

In some implementations, the user lookup module 328 can also be used by the relay server 306 to perform a PIN information update in which PIN information contained in the relay data store 308 is used to update PIN information that is stored locally at a given mobile device.

Also, in some implementations, the message handling module 326 can interact with the user lookup module 328 to obtain PIN information needed for a message that must be transmitted. For instance, the message handling module 326 can identify a message as a pseudo-PIN message and can then interact with the user lookup module 328 to replace each e-mail address in the address fields of the pseudo-PIN message with the corresponding PIN address, configure the pseudo-PIN message as a standard PIN message and send the PIN message to the intended recipients.

Further, in some implementations, the message handling module 326 can be instructed or configured to check that the PIN addresses associated with a PIN message are current and up-to-date. Accordingly, the message handling module 326 can interact with the user lookup module 328 to verify that each PIN address is up-to-date, and if not then update the PIN addresses in the PIN message. In some implementations, the user lookup module 328 can also initiate a message that is sent to the mobile device that sent the PIN message, so that the old PIN addresses can be updated on the mobile device.

In either of these cases, there can be some implementations in which the user lookup module 328 can initiate a query that is sent to another relay site that is connected to the relay site 300 via the relay bridge 318. This can occur when the user lookup module 328 does not locate any matches in the relay data store 308 when looking up PIN information, and in such situations the user lookup module 328 is configured to initiate a query to a related relay site.

The provisioning system 310 may be co-located or otherwise associated with the relay site 300 for setting up and managing various service providers (i.e. carrier networks), subscribers, mobile device manufacturers, resellers, and other entities in order to support any number of service and market differentiation requirements. The provisioning server 310 includes subscriber validation logic and stores information identifying the services that are enabled for a specific subscription for each user, i.e. for a specific SIM card 126. The provisioning server 310 receives this information from the registration server 312. Whenever a SIM card in a mobile device is changed, the mobile device re-registers with the relay server 306 so that those services enabled for that (SIM) subscription can be identified and allowed. In some implementations, the provisioning system 310 can additionally include logic for provisioning personalized indicia (e.g. PIN assignment and management) with respect to the mobile devices. The provisioning server 310 can also obtain information regarding services in which the mobile device 100 can have an additional identity, such as an instant messaging service using PIN addresses and provide the additional identity to the relay database 330 to be stored based on the PIN address of the mobile device 100, and the instant messages can be sent based on the PIN address.

The registration server 312 is mainly used in the registration process when the mobile device 100 is being used for the first time, when a new SIM card 126 is being placed into the SIM interface 128 of the mobile device 100, or when the user of a given mobile device 100 re-registers due to moving to a different wireless network coverage area. In some implementations, the location information of the registration server 312 may be stored locally in the mobile devices. When a particular mobile device 100 registers successfully, the registration server 312 can provide the location of the relay site 300, so that data can be sent between the particular mobile device 100 and the relay site 300. The registration server 312, which handles administration and registration services for the mobile devices 100, may also be provided with separate wireless transport and packet routing for interfacing with a given carrier network, although this is not specifically shown. New registration information for a new mobile device that is associated with the relay site or for an existing mobile device already associated with the relay site that has been updated can be recorded in the relay database 330 to ensure that the information is current. As mentioned, the registration server 312 can also be located remotely with respect to the relay site, and in some embodiments, the functionality of the registration server 312 can be provided by the enterprise server 272.

The wireless transport (WT) interface 314 is provided as part of the relay site 300 for connecting with a wireless carrier network that provides network service to the mobile devices that communicate with the relay site 300. The WT interface 314 can communicate with a respective packet router 316 using TCP/IP links, in some implementations, which route data packets to and from respective wireless packet data service networks, exemplified in FIG. 4 as public or private network 224. To facilitate accurate routing, the packet router 316 can use the current IP address of a particular mobile device 100 for addressing a data packet. It should be understood that there can be multiple sets of WT interfaces 314 and packet routers 316 for servicing different carrier networks.

In some implementations, there can be multiple relay sites that are connected to one another in a distributed fashion. Accordingly, the relay site 300 includes the relay bridge 318 for supporting inter-relay connectivity. In some implementations, the relay bridge 318 connects with separate relay node sites, forming tunnels between different relay sites over which messages can flow between services and mobile devices 100, irrespective of the region in which the mobile device 100 is in.

The relay site 300 can also be connected to one or more servers for providing an application service to users that access the relay site 300. In this exemplary embodiment, the relay site 300 is connected to one or more application servers 320 which can include one or more of a mail server, a voice mail server, and the like. The voice-mail server allows users associated with the relay site 300 to receive voice-mail on mobile devices that support voice communication. The relay site 300 can be further connected with other gateways 322 to provide additional services such as, for example, an Internet gateway to allow users that access the relay site 300 to browse the Internet. Other examples of gateways include an Instant Messaging (IM) gateway, a Short Messaging Service (SMS) gateway, and the like. There can also be a generic service gateway (not shown) that can connect to additional gateways, such as a Multi-Media Service (MMS) gateway, to provide additional functionality. Communication between the relay site 300 and the application servers 320 and the other gateways 322 can be implemented using any suitable protocol, e.g., Server Relay Protocol (SRP), preferably over IP links.

Referring now to FIG. 5, shown therein is an illustration of an exemplary embodiment of various fields that may be used in a relay database 330 contained within the relay data store 308. Generally the relay data store 330 can be considered to have relay information that includes e-mail address information, user information, and PIN information. The PIN information generally includes PIN address information and PIN date changed information for a given mobile device associated with the relay site 300.

Alternatively, the relay data can be located (i.e. distributed) among a multiplicity of locations and databases. Advantageously, in either of these cases, the relay data is not located solely at a host or enterprise location, but rather as part of the infrastructure of the PIN messaging service provider, so that PIN and pseudo-PIN messaging is implemented using an approach that is not dependent on the enterprise (i.e. customer) equipment. Therefore, the PIN messaging service is available at all times to perform PIN lookup and update functions.

The relay database 330 can be used to handle and manage location and device information, available services, authorization settings and other key operational parameters for all of the mobile devices that communicate with the relay site 300. In some cases, the location and device information can be indexed by the PIN address indicia of these mobile devices, which may be programmed into the mobile devices 100 at the time of manufacture or dynamically assigned afterwards. The information can also be indexed by the user's name or e-mail address. The location information can include the last known location for each mobile device. The relay data store 308 may also be accessed by other services and network components that are able to access the system 250 through gateways, or other wireless networks.

In general, the fields of the relay database 330 can include an e-mail address field 332, a PIN address field 334, a PIN date changed field 336, a Subscription Information field 338, a SIM Info field 340, an IMEI info field 342, a name field 344, and a location field 346. The relay database 330 may be searched based on at least a portion of a user's e-mail address, name or PIN address. Searching the relay database 330 by PIN address allows one to determine when that PIN address was entered into the corresponding database record or updated. It should be noted that in some implementations some of these fields are optional. Further, it should be noted that in some implementations the relay database 330 can include additional fields.

For a given record for a mobile device 100, the e-mail address field 332 contains the e-mail address of the user of the mobile device 100. The PIN address field 334 contains the PIN address that is associated with the mobile device 100 currently being used by the user. The PIN date changed field 336 contains the date at which time the user's PIN address last changed (for example, this can be the date that the user started using a different mobile device 100). The subscription information field 338 contains information with regards to the particular services that are enabled for a particular subscription.

The SIM Info field 340 specifies whether a phone number associated with the subscription has an MSISDN number, which is a standard international telephone number that may be used to identify the user, or an IMSI number. Generally, each SIM card 126 will have been assigned a unique 15-digit IMSI number. The IMSI number allows any network to know the home country and network that is associated with the user. The IMEI field 342 specifies the IMEI number, or if the mobile device 100 does not have one, the serial number that is associated with the mobile device 100. An IMEI (International Mobile Equipment Identity) number is a unique number that is given to most devices, which can function as phones. The IMEI field 342 may more generally be referred to as a device identification field and may alternatively include an iDEN, GSM or ESN number. The name field 344 specifies the names of the user of the wireless device 100. The location field 346 can include the physical location of a particular mobile device 100.

In some embodiments, PIN-email pair information in the relay data store 330 can be provided by the enterprise server 272, which synchronizes the mobile devices 100 with encryption keys. For example, when a user synchronizes a new mobile device with the enterprise server 272, the enterprise server 272 generates an encryption key that is used for e-mail messaging. The enterprise server 272 can then send the e-mail address-PIN pair information to the relay server 306. The relay server 306 can then store the e-mail information in the record of the relay database 330 with the matching PIN address. However, the enterprise server 272 can be configured to not send this information only when there is a re-synchronization of a previously-synchronized device. Thus, the enterprise server 272 can be configured to send the email and PIN address information only when it has changed to minimize the update load on the relay database 330.

As shown in FIG. 4, the enterprise server 272 is connected to the message server 268. To enable a mobile device 100 to be used for wireless email service with the host system 250, an encryption key (that is known only to the enterprise server 272 and the mobile device 100) can be generated. There are two methods of generating a key. One method requires the mobile device 100 to be connected to the enterprise server 272 using a computer on the network of the host system 250 (as shown in FIG. 4) that is physically connected to the mobile device 100 during the generation of the encryption key. The second method generates a key through a secure, 'over-the-air' procedure. In both methods, the PIN of the mobile device is made available to the enterprise server 272 and the e-mail address-PIN pair information can be generated at this point (at this time, in at least some implementations this pair information can also be sent the relay site 300).

In other embodiments, an additional "Internet" server can provide e-mail and Internet service. This additional server is not located at the host system 250, and can be included at the relay site 300 in some implementations (not shown) or otherwise located elsewhere in the wireless network 200. The Internet server can contain the e-mail and PIN address pair information, and does not need to obtain the information from the host system 250. When an "Internet" e-mail account is set up, the PIN address of the mobile device can be made known as part of the subscription set-up process. The PIN address is used by the subscription on the Internet server; should another mobile device be selected to replace an existing mobile device, the PIN address of the new mobile device will be inserted into the subscription information, replacing the PIN address of the previous mobile device. This e-mail and PIN address pair information can also be made readily available to the relay server 306. PIN and pseudo-PIN messages can also be generated by users that are associated with the Internet server. However, users associated with the Internet server can use more than one e-mail address, and so both of the e-mail addresses should be associated with the PIN address in the relay database 330. The PIN and pseudo-PIN messages can be sent to the Internet server which then sends the messages to the relay server 306 for handling as described below.

Typically, the mobile device 100 will have been assigned a unique PIN address at the time of manufacture. This is referred to as a static PIN address. However, in some cases the mobile device 100 may not have been assigned a PIN address at the time of manufacture in which case PIN messaging will not be possible with conventional systems. In these situations, the PIN assignment module 324 can assign a PIN address to such a mobile device 100. For instance, when a mobile device 100 is first being registered, the registration information or update information is sent to the relay database 330 for storage. If the registration information does not include a PIN address and there is no corresponding PIN address for the new mobile device, then the PIN assignment module 330 will assign the mobile device 100 with a new PIN address and store the new PIN address in the PIN address field 334 of the relay database 330. The mobile device 100 will also store the PIN address in a non-volatile memory store. In these instances, the newly assigned PIN address may be referred to as a dynamic PIN address. In other embodiments, the assignment of PIN addresses can be performed by other servers associated with the registration process, such as the enterprise server 272 for example.

In an alternative embodiment, the PIN address that is stored in the PIN address field 334 of the relay database 330 may not be the PIN address that was assigned to the mobile device 100 at the time of manufacture. In this case, the user has been assigned a virtual PIN address that is specific to that particular user, just as an e-mail address is specific to the user and can be used by the user on different computing devices. The virtual PIN address may be stored as part of the information contained in the SIM card 126, which is specific to the user. In either of these cases, the relay database 330 can include another field (not shown) to indicate the type of PIN address that is assigned to the mobile device that is recorded in the relay database 330 (alternatively, this information can also be stored in the PIN address field 334).

In a further alternative, the PIN assignment module 330 may assign a dynamic PIN address that is the same as the static PIN of the mobile device 100. This occurs when the mobile device 100 is on a core stack load that is upgraded from a static PIN to a dynamic PIN.

For the purposes of the following examples, PIN or pseudo-PIN messages (defined below) are composed on a mobile device by a sending user. The PIN or pseudo-PIN message can include one or more recipient users specified in its address fields. Accordingly, the processes described below can be used to obtain information for one or more recipient users specified in the address fields of a PIN or pseudo-PIN message. While the processes will now generally be described in terms of obtaining information for a single recipient user, this is done for ease of description, and the processes can be used for obtaining information for more than one recipient user.

Figure 6:
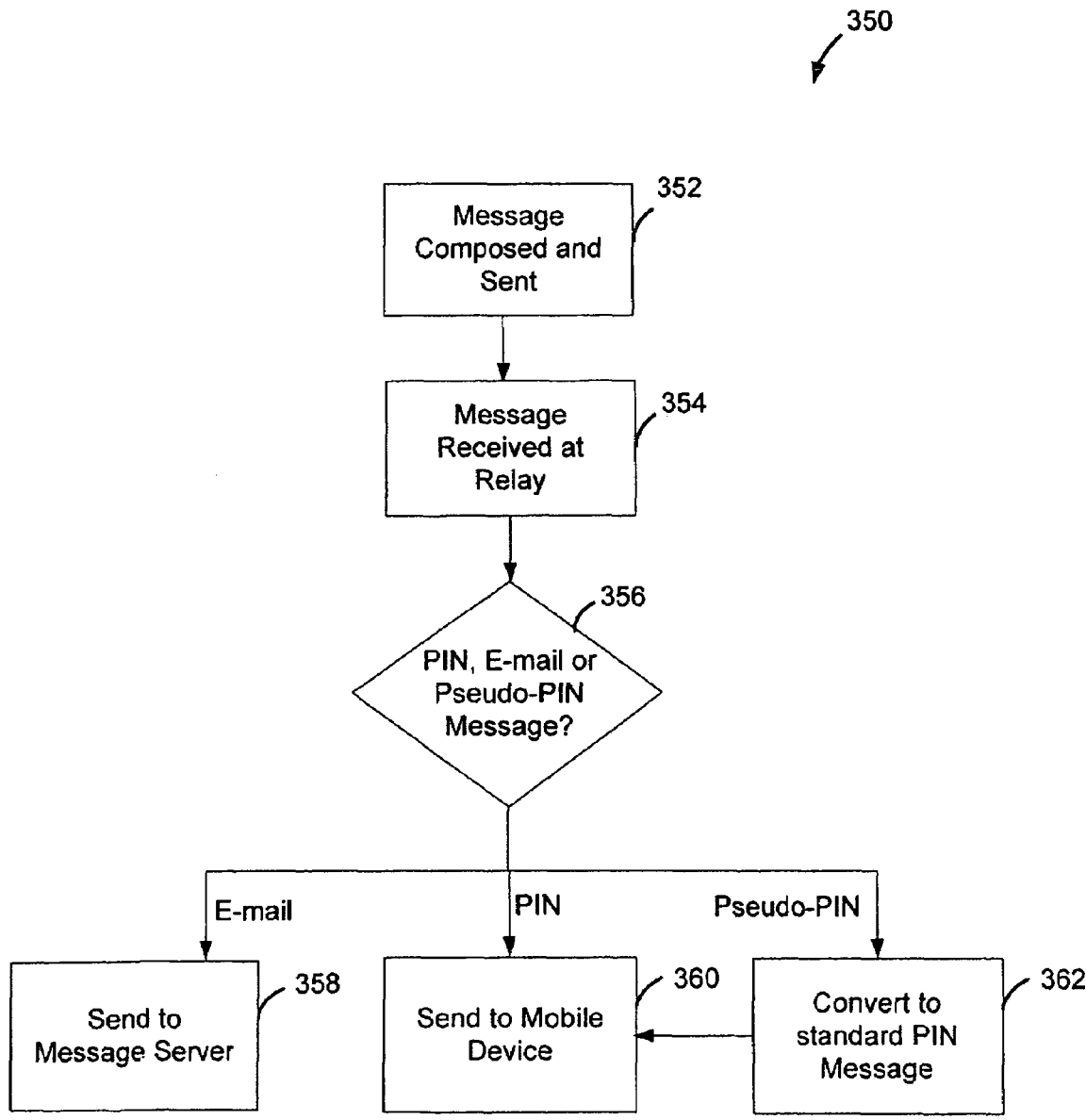
FIG. 6 is a flowchart diagram illustrating an exemplary embodiment of a method by which the relay server will process e-mail and PIN messages sent by mobile devices.

Referring now to FIG. 6, shown therein is a flowchart illustrating an exemplary embodiment of a message handling process 350 by which the relay server 306 can process e-mail and PIN messages sent by wireless mobile devices. The message handling method 350 begins at step 352 at which a message is composed that can be either an e-mail message, a PIN message or a pseudo-PIN message. Similar to composing an e-mail message in which one or more destination e-mail addresses are specified, a user can also compose a PIN message and specify one or more destination PIN addresses in a message by placing one or more PIN addresses in one of the recipient address fields of the message (i.e. the "TO", "CC" or "BCC" address fields). The pseudo-PIN message is a PIN message in which at least one e-mail address is specified in an address field.

The message handling process 350 then proceeds to step 354 in which the message is received at the relay site 300. The message handling module 326 then checks the message to determine whether it is an e-mail message, a PIN message or a pseudo-PIN message in step 356. For e-mail messages, the process 350 moves to step 358 in which the message handling module 326 directs the message to the message server 268 at the host system 250. For PIN messages, the process 350 moves to step 360 in which the PIN message will be sent directly to the mobile device(s) that correspond to the destination PIN address(es). For pseudo-PIN messages, the process 350 moves to step 362 in which the pseudo-PIN message is converted to a standard PIN message which is then sent to the recipient mobile devices in step 360.

If for any reason any portion of the host system 250, such as either the message server 268 or the enterprise server 272 for example, is not functioning and is not able to receive and/or transmit e-mail messages, the relay site 300 will still be able to receive and subsequently transmit PIN and pseudo-PIN messages since the relay site 300 can act independently of the host system 250. Accordingly, at the time of any incident in which the host system 250 is not able to process e-mail messages, PIN and pseudo-PIN messages are a vital means by which users of the mobile devices 100 may communicate.

A PIN address bears no resemblance to an e-mail address associated with the user of the mobile device 100. Consequently, they may not be easy to remember. Therefore, if a sending user wishes to compose and send a PIN message to a recipient user of a mobile device 100, then the sending user will generally have to make note of the recipient user's PIN address either in the local address book 140 that is provided on the mobile device 100 or through some other means, such as the conventional technique of querying the enterprise server 272, which also typically includes PIN address information in one of the data stores 276 and 278.

Figure 7:
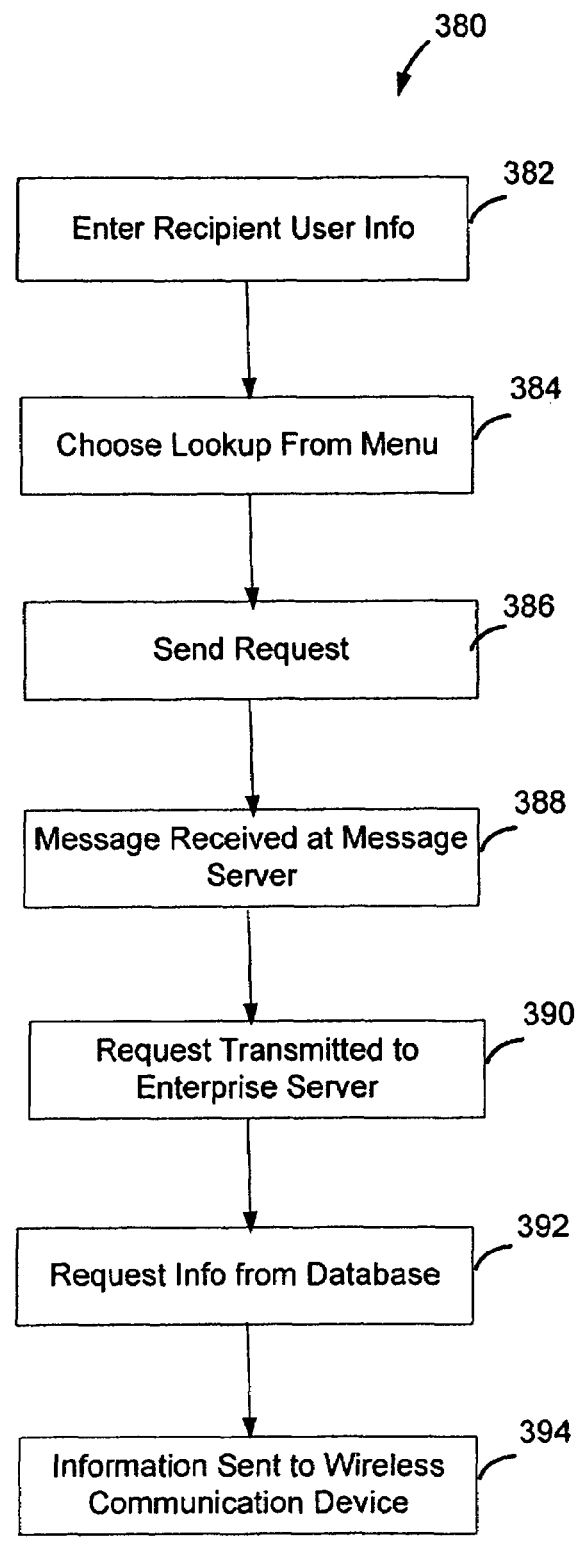
FIG. 7 is a flowchart diagram illustrating an exemplary embodiment of a conventional method by which information requests are conventionally handled by the host system of FIG. 4.

The enterprise server 272 is able to receive and process requests for information requested by a user associated with the host system 250 by consulting one of the data stores 276 and 278. Referring now to FIG. 7, shown therein is a flowchart illustrating an exemplary embodiment of a conventional information request process 380 by which information requests can be handled by the enterprise server 272. The information request process 380 begins at step 382 in which a user enters some information for a recipient user of another mobile device 100 that is associated with the host system 250. To facilitate the search, the user doing the search can provide at least part of the name or e-mail address of the recipient user for which they require information.

The information request process 380 then proceeds to step 384 in which the user doing the search chooses to perform a Lookup function using search options that are provided by the enterprise server 272 and accessible by the mobile device 100 of the user doing the search. The user doing the search then sends the request in step 386 through the relay site 300 to the host system 250. The search request is then received by the message server 268 in step 388 and transmitted to the enterprise server 272 in step 390.

The information request process 380 then proceeds to step 392 at which point the enterprise server 272 will search one of the data stores 276 and 278 to determine if there is a user in the database that matches the one being searched for. If a match is found, then in step 394, the search results, which is generally information including PIN address of the user being searched for, is transmitted to the mobile device 100 of the user that is performing the search. If a match is not found, then a corresponding message is sent to the mobile device 100 of the user that is performing the search.

One example of process 380 is when a sending user is composing an e-mail message and is searching for a recipient user's e-mail address. The sending user enters the full or partial name of the recipient user as a search string into a search dialog box and then selects the "Lookup" command from a menu provided by the address book application 140 or the message application 138. Once the address book application 140 determines that there isn't any corresponding matching information stored locally on the mobile device 100, the mobile device 100 sends a request along with the search string to the enterprise server 272. The enterprise server 272 can then look into the global address list data store 278, or another suitable data store, to determine if there is matching information. If a match is found, then the enterprise server 272 can send the corresponding information to the mobile device that made the request. The sending user can then "view" the information as well as "add" the information in an entry in the address book application 140 for the recipient user. This technique works well for recipients who have information stored in one of the data stores 276 and 278. However, the sending user cannot access information for recipients that are not stored in one of the data stores 276 and 278. This can include recipients that are associated with other host systems (i.e. companies) and users who only have access to the internet.

As another example of process 380, a sending user can be composing a PIN message and needs to look up the PIN address of a recipient user. The sending user then accesses the address book application 140 or the message application 138 to select a recipient's PIN address. If the recipient has a PIN address that is locally stored on the mobile device 100, the sending user can select the PIN address of the recipient and place it into one of the address fields of the PIN message. The PIN message can be sent once it has been composed and all of the recipient PIN addresses have been entered into the address fields of the PIN message. If the recipient user does not have a PIN address stored locally on the mobile device 100 of the sending user, then the sending user can request this information using the process 380 and can search the data stores 276 and 280. Alternatively, but more cumbersome, the sending user can contact the recipient, the recipient's office or another potential source of the recipient's PIN address in order to determine the address.

However, in conventional systems, there can be situations in which it is not possible to lookup this information in the manner described in FIG. 7 because one or more components of, or associated with, the host system 250 is not functioning. Furthermore, in conventional systems, the PIN address that is stored on the mobile device 100 (in the address book entry for that addressee, for example) may not be up-to-date. For example, the addressee may have changed to a different mobile device, which will have a different PIN address. While the PIN address of this new mobile device can be known by the enterprise server 272 and/or the Internet wireless email server, the other user may not have updated the address book entry in their own wireless device. Accordingly, a lookup operation, as specified in process 380, must be done to check whether the PIN address is up-to-date. Unfortunately, the PIN address information in the data stores 276 or 278 of the host system 250 may not be accessible under certain circumstances. To address these shortfalls of conventional systems, additional functionality can be provided at the relay site 300 that does not require communication with the host system 250.

Figure 8:
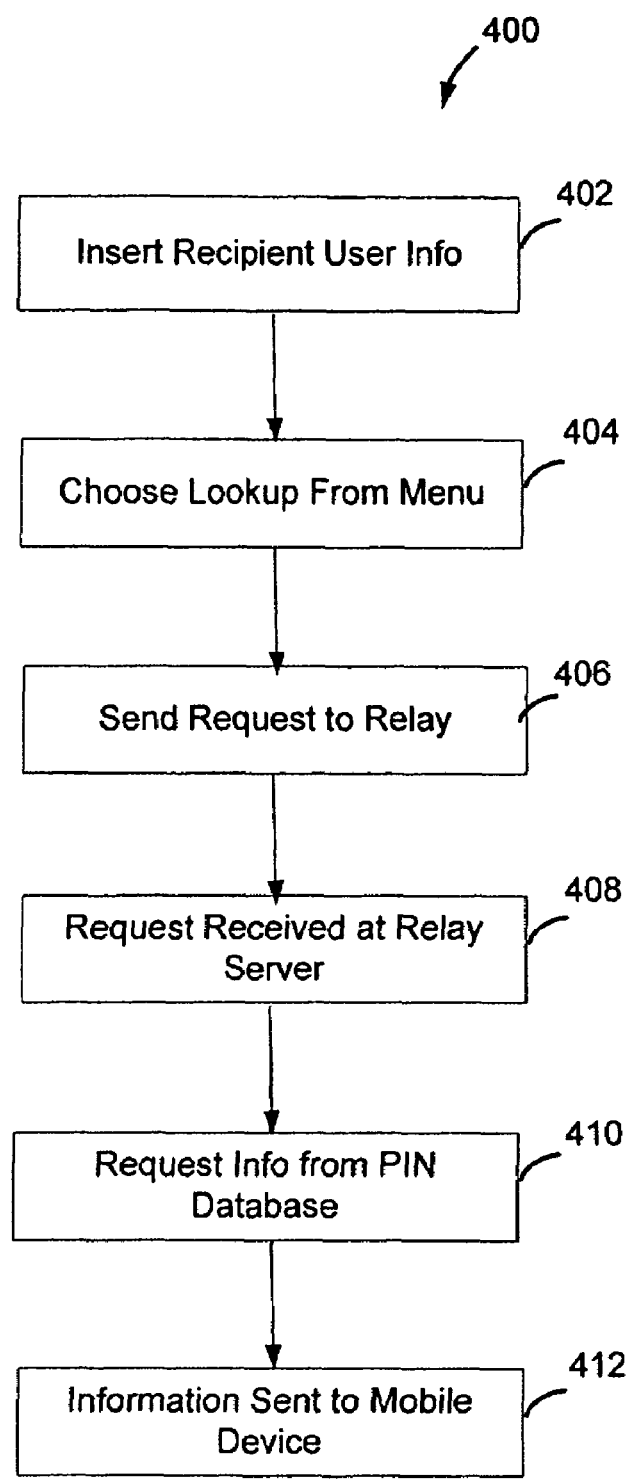
FIG. 8 is a flowchart diagram illustrating an exemplary embodiment of a PIN lookup method.

Referring now to FIG. 8, shown therein is a flowchart illustrating an exemplary embodiment of a PIN lookup process 400. The PIN lookup process 400 begins at step 402 in which a sending user of a mobile device 100 is composing a PIN message and requires the PIN address of a recipient user. The PIN address is not stored locally on the mobile device 100. The sending user enters at least part of the name of the recipient or other related information into a search field provided by an appropriate application on the mobile device 100. At step 404, the sending user is provided with a list of options from which they can choose to perform the user lookup. The process 400 then moves to step 406 where the lookup request is transmitted to the relay server 306. At steps 408 and 410, the user lookup module 328 uses the search information that has been provided by the sending user to search the relay database 330 to determine if such a recipient user exists in the relay database 330. At step 412, the search results are then transmitted to the mobile device 100 from which the request was made. If a match has been made, the PIN address associated with the recipient user will be returned to the requesting mobile device 100. The sending user may then view the PIN address, add the PIN address to a corresponding record in the local address book 140 on the mobile device 100 if the record already exists, or form a new record in the local address book 140 and add the PIN information to it. The PIN lookup process 400 may also return to the user any other information that is related to the recipient and contained in the relay database 330. At step 410, if the user information is not located in the relay database 330, the relay site 300 can communicate with other relay sites via the relay bridge 318 to look for the recipient user.

The PIN lookup process 400 is particularly useful for allowing the sending user to lookup the PIN address of another user and update their local address book 140 since some of the mobile device users may have changed their mobile device for various reasons and hence their PIN addresses may change. Accordingly, the PIN lookup process 400 is typically employed when the PIN address of a recipient user in a PIN message is not known or if the PIN address of the recipient user is being checked to see if it has been updated. In some alternative embodiments, the message application 138 or the address book application 140 of the mobile device 100 may periodically check with the relay site 300 to determine whether all locally stored PIN addresses are up-to-date.

The enterprise server 272 can provide the relay server 306 with updated information whenever a new or different mobile device is synchronized to an enterprise email account (i.e. when generating an encryption key for the enterprise server 272 and the mobile device) to ensure that these two components are synchronized at all times Since PIN messages will be employed in situations in which the host system 250 may not be able to process e-mail messages, which may occur during emergencies, processing time and ease of use is of great importance. Therefore, a method is provided by which the sending user of the mobile device 100 can enter the e-mail address of a desired recipient user into a pseudo-PIN message, and the pseudo-PIN message is transmitted to the appropriate mobile device 100 even when the host system 250 is not functioning.

Figure 9:
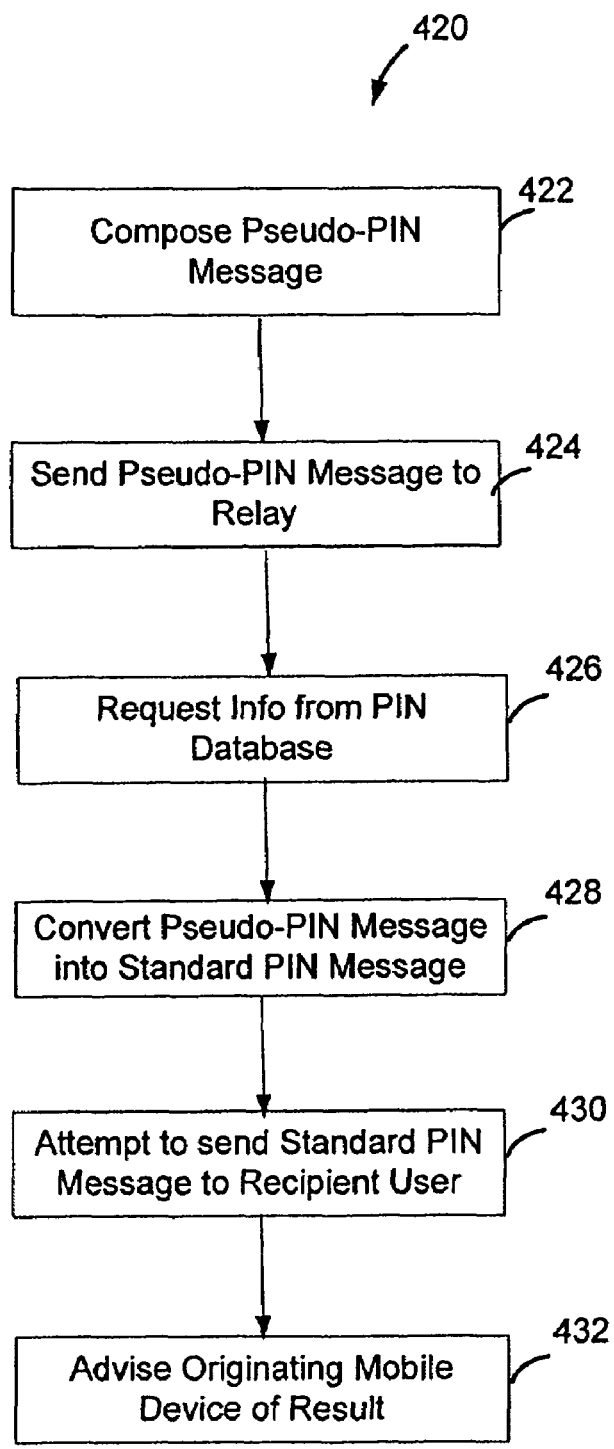
FIG. 9 is a flowchart diagram illustrating an exemplary embodiment of a message transmittal method.

Referring now to FIG. 9, shown therein is a flowchart illustrating an exemplary embodiment of a message transmittal process 420. The message transmittal process 420 provides a means by which communication between mobile devices 100 may be facilitated when the host system 250 is not operational. In particular, the message transmittal process 420 allows for greater ease of communication when the host system 250 is not able to process e-mail messages, since it allows for a sending user of a mobile device to enter an e-mail address of a recipient user into a PIN message and transmit the message as a PIN message.

The message transmittal process 420 begins at step 422 in which a user composes a pseudo-PIN message and enters the e-mail address of a recipient user in an address field of the pseudo-PIN message. This saves the user from having to perform a lookup of the intended recipient user's PIN address and ensures that the recipient user's current PIN is used. For instance, a user may wish to send a PIN message to a recipient user's device but several things may have happened to the recipient user's device that warranted the recipient user obtaining a new device with a different PIN. However, the recipient user's e-mail address remains the same. Advantageously, this allows a sending user with knowledge only of the intended recipient user's e-mail address to send a PIN message in the place of an e-mail message if the host system 250 cannot send e-mail messages.

At step 424, the pseudo-PIN message is sent to the relay site 300. The message does not have to be encrypted when sent to the relay site 300. At step 426, the recipient user PIN addresses that correspond to all of the recipient user e-mail addresses are looked up in the relay database 330 by the user lookup module 328. At step 428, when all of the corresponding recipient user PIN addresses have been located, the pseudo-PIN message is converted to a standard PIN message and the corresponding PIN addresses are added to address fields.

At step 430, the relay server 306 then attempts to send the PIN message to the appropriate mobile devices, by making use of PIN messaging protocols that are employed by the relay site 300. Accordingly, the pseudo-PIN message has been converted to a PIN message and is not sent to the host system 250. The relay server 306 then advises the originating mobile device which sent the pseudo-PIN message of the result at step 432. For instance, if recipient user PIN addresses were located for each recipient user e-mail address, the transmission is generally considered to be successful, and the relay server 306 sends back the current recipient user PIN addresses that were located. The original mobile device 100 can then store this information in the local address book 140 for each recipient user for which the corresponding PIN address has been updated, or if there was no original PIN address entry in the local address book 140 for any of the recipient users addressed in the PIN message.

It should be noted that the relay database 330 includes the PIN addresses for all users that are associated with the relay site 300. In an alternative embodiment, the relay server 306 can obtain the required recipient user PIN addresses from the relay database of other relay sites that the relay site 300 can be connected to via the relay bridge 318.

Figure 10:
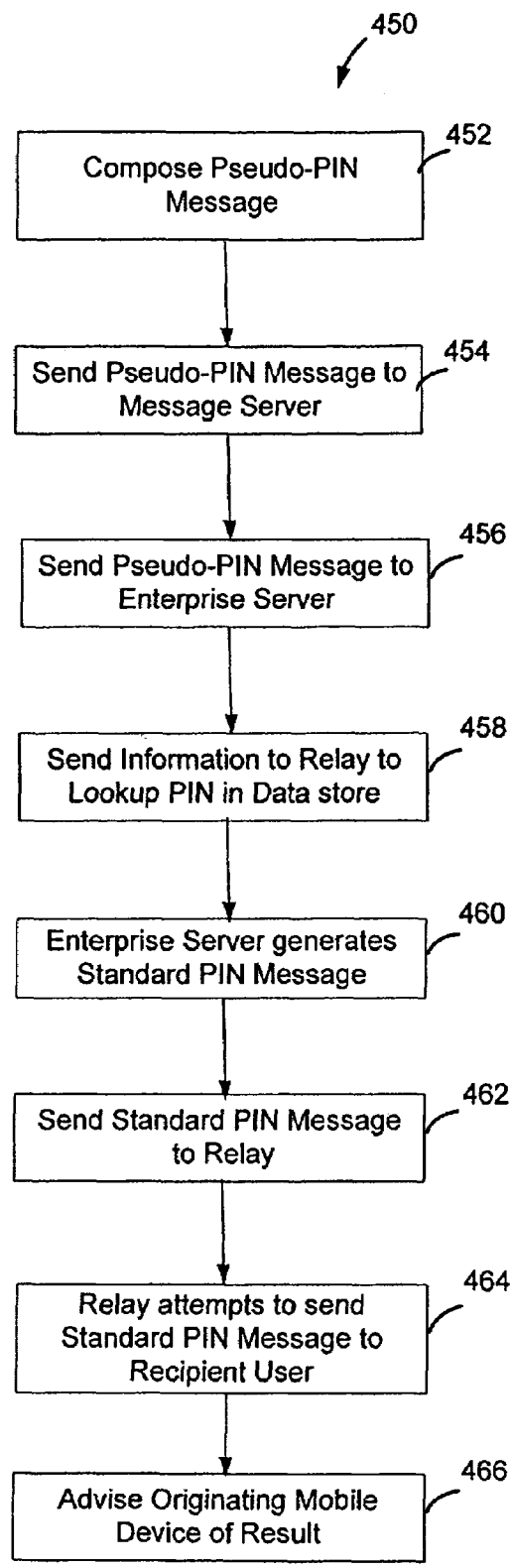
FIG. 10 is a flowchart diagram illustrating another exemplary embodiment of a message transmittal method.

Referring now to FIG. 10, shown therein is a flowchart illustrating another exemplary embodiment of a message transmittal process 450. The message transmittal process 450 provides another means of communication between mobile devices 100 that utilizes the host system 250 and the relay site 300. At step 452, a pseudo-PIN message is generated by composing a PIN message and inserting one or more recipient user email address(es) in the address fields. The pseudo-PIN message is sent to the message server 268 at step 454, which in turn sends the pseudo-PIN message to the enterprise server 272 at step 456. The pseudo-PIN message can be encrypted. Accordingly, the enterprise server 272 can decrypt the pseudo-PIN message.

At step 458, the enterprise server 272 sends information to the relay site 300 to lookup the PIN addresses of each recipient user that is specified with an e-mail address in the pseudo-PIN message. The relay server 306 then checks the relay database 330 to determine the current PIN addresses for each e-mail address in the pseudo-PIN message and sends these PIN addresses back to the enterprise server 272. In an alternative, the information sent to the relay site 300 can also include the recipient user PIN addresses that are used in the pseudo-PIN message so that the relay server 306 can verify that these PIN addresses are current and up-to-date.

At step 460, the enterprise server 272 receives the PIN addresses from the relay site 300 and generates a standard PIN message. At step 462, the enterprise server 272 sends the PIN message to the relay site 300. At step 464, the relay site 300 then attempts to send the PIN message to the specified recipient users. At step 466, the mobile device that originated the pseudo-PIN message is then advised of the result. If PIN addresses were found for each recipient e-mail address specified in the pseudo-PIN message, then the PIN message is sent successfully. If PIN addresses were not found for each recipient e-mail address specified in the pseudo-PIN message, then the PIN message is not sent. In either case, the located PIN addresses can be sent to the mobile device that generated the pseudo-PIN message so that this information can be stored by the local address book application 140. In an alternative, in the case where the relay server 306 determines that a PIN address is out-of-date, the mobile device that generated the pseudo-PIN message can receive the updated PIN address and store this information in the local address book 140.

Each of the processes 400, 420 and 450 can be used to ensure that the current PIN address information is used based on accessing the relay database 330. These processes can also allow access to PIN addresses for users that are not contained in the global address list in the data store 278 associated with the sending user's host system 250. This can be done by allowing relay sites 300 to communicate with one another when a search in the relay database of a given relay site does not find a corresponding match.

Furthermore, the processes 400, 420 and 450 can provide the located current PIN addresses to the mobile device 100 that generated a request for this information, or a pseudo-PIN message that required this information. The local address book 140 can then be configured to automatically update this information in the local data store of the mobile device 100.

Alternatively, the mobile device 100 can be configured to notify the sending user that PIN information has been received, and the sending user can choose to update the entries in the local address book 140 based on this PIN information.

IT policy settings can be specified via the enterprise server 272 to manage the operation of the mobile devices associated with the host system 250 with regards to PIN messaging. This IT policy can be disseminated from the enterprise server 272 to the various mobile devices to configure these devices. For instance, some or all of the mobile devices can configured such that: 1) all PIN messages that are sent to the host system 250 are sent as pseudo-PIN messages, or 2) all PIN messages sent to the host system 250 are sent as standard PIN messages.

The IT policy settings may also be used to keep PIN-e-mail pair information restricted for use by users associated with the host system 250, or to allow the information to be used by certain external users that are given permission by the host system 250. IT policy can also be used to allow or prevent others outside of the e-mail domain of the host system 250 from being able to send a pseudo-PIN message to addresses using e-mail addresses associated with the host system 250. Accordingly, access to the e-mail-PIN address pair information may be restricted to classes of users (i.e. restricted access for sender's who have e-mail accounts with the host system 250). However, a situation can also arise in which a user may have both enterprise and Internet service (recall the Internet server), and thus have two e-mail addresses. This could result in the situation in which the enterprise server 272 does not allow an external sending user to send pseudo-PIN messages to users associated with the host system 250 based on the external sending user's e-mail address, but a pseudo-PIN message sent from the external user's Internet e-mail address may be converted to a standard PIN message and sent to the recipient users.

In an alternative embodiment, through additional functionality provided by the relay server 306, the users associated with the PIN addresses can choose to allow or prevent their PIN address from being looked up by users outside of their organization. Alternatively, these users can be asked for permission whenever such a lookup is requested. For instance, the request can show the name and e-mail address of the user that is making the request. This information can be provided to the mobile device of the user that is being asked to allow the lookup request. Alternatively, the relay database can include IT policy information to prevent dissemination of PIN information for a given user.

In addition, each of the processes 400, 420 and 450 can allow the sending user to manually enter the PIN address of a recipient in the PIN message. Furthermore, these processes can allow the sending user to use the PIN addresses that are stored in the local address book 140. Conversely, in some implementations, when a PIN message is composed, the processes 400, 420 and 450 can be configured to automatically perform a lookup to ensure that each recipient PIN address that is used is up-to-date.

In addition, in at least some embodiments, an e-mail address can be associated with more than one PIN address in the relay data store. This is applicable for cases in which a recipient user has more than one mobile device. Accordingly, when a pseudo-PIN message is sent to the recipient user, more than one PIN message can be generated for that particular recipient user so that the recipient user receives the PIN messages on each of their mobile devices.

A relay site associated with a wireless network can send messages between mobile devices associated with the wireless network without having to transmit the messages to a host system. The messages include PIN messages and each of the mobile devices has a PIN address. The relay site includes a relay server for controlling the operation of the relay site, and sending the PIN messages between the mobile devices. The relay site also includes a relay data store having PIN information for users associated with the mobile devices. The relay server can access the relay data store for allowing users using the mobile devices to query the relay data store for PIN information.

In one aspect, at least one embodiment described herein provides a relay site associated with a wireless network for supporting communication of messages between mobile devices associated with the relay site. Each of the mobile devices have a Personal Identification Number (PIN) address. The relay site comprises: a relay data store having relay information for the mobile devices associated with the relay site, the relay information including PIN information; a relay server connected to the relay data store, the relay server being adapted to control the operation of the relay site, the relay server comprising a user lookup module for querying the relay data store for PIN information for one or more recipient users specified in a given message; and a network interface connected to the relay server, the network interface being adapted for connecting the relay site to the wireless network.

In at least some embodiments, the relay information can include e-mail address information and user information, and the PIN information can include PIN address information and PIN date changed information for a given mobile device associated with the relay site.

In at least some embodiments, the relay server can communicate with an enterprise server for receiving e-mail and PIN address pair information to associate the e-mail address information with the PIN information stored on the relay data store.

In at least some embodiments, the messages have a message type including e-mail, PIN and pseudo-PIN, and a pseudo-PIN message is a PIN message with at least one e-mail address specified in an address field of the PIN message.

In at least some embodiments, the relay server can further comprise a message handling module adapted for discriminating between the messages received at the relay site based on the message type, and processing the message based on the message type.

In at least some embodiments, the given message can be a given pseudo-PIN message and the message handling module can interact with the user lookup module to obtain a PIN address for each e-mail address specified in an address field of the given pseudo-PIN message, convert the given pseudo-PIN message to a standard PIN message and send the standard PIN message to recipient mobile devices.

In at least some embodiments, the message handling module can be adapted to prevent the conversion based on the identity of the sending user that generated the given pseudo-PIN message.

In at least some embodiments, the relay site can interact with an enterprise server and when a given pseudo-PIN message is received at the enterprise server, the enterprise server can request and receive corresponding PIN information provided by the user lookup module of the relay server for each e-mail address specified in an address field of the given pseudo-PIN message, convert the given pseudo-PIN message into a standard PIN message and send the standard PIN message to the relay site for distribution to recipient mobile devices.

In at least some embodiments, the relay site can interact with one of the mobile devices to update PIN information stored thereat.

In at least some embodiments, the relay site can further comprise a relay bridge to connect the relay site to additional relay sites having additional relay data stores, and the user lookup module can be adapted to query at least one of the additional relay data stores when desired PIN information is not located at the relay data store.

In at least some embodiments, the relay server can be adapted to generate two or more PIN messages for e-mail addresses that are associated with two or more PIN addresses.

In another aspect, at least one embodiment described herein provides a mobile communications device comprising: a main processor that controls the operation of the mobile communications device; a communication subsystem connected to the main processor, the communication subsystem being adapted to send and receive data including messages; and a message application that interfaces with the communication subsystem to send and receive the messages; the message application being adapted to allow a user of the mobile communications device to generate a pseudo-PIN message by specifying at least one e-mail address in an address field of a PIN message, and transmit the pseudo-PIN message to an associated relay site.

In at least some embodiments, the mobile communications device further comprises an address book and can be adapted to update the address book with PIN information provided by the associated relay site.

In another aspect, at least one embodiment described herein provides a wireless network comprising the relay site. The wireless network further comprises a plurality of the mobile communication devices as specified above.

In at least some embodiments, the wireless network can further comprise an enterprise server and when a given pseudo-PIN message is received at the enterprise server, the enterprise server can be adapted to request and receive corresponding PIN information provided by the relay site for each e-mail address specified in an address field of the given pseudo-PIN message, convert the given pseudo-PIN message into a standard PIN message and send the standard PIN message to the relay site for distribution to recipient mobile devices.

In one aspect, at least one embodiment described herein provides a method for supporting communication of messages between mobile devices associated with a relay site, each of the mobile devices having a Personal Identification Number (PIN) address, wherein the method comprises: receiving a request at the relay site from a given mobile device for PIN information for a recipient user; searching a relay data store for the requested PIN information; and sending search results to the given mobile device.

In at least some embodiments, the method can further comprise storing e-mail address information, user information, PIN address information and PIN date changed information at the relay data store for a given mobile device associated with the relay site.

In at least some embodiments, the relay server can communicate with an enterprise server for receiving e-mail and PIN address pair information to associate the e-mail address information with the PIN information stored on the relay data store.

In at least some embodiments, the method can further comprise searching an additional relay data store of an additional relay site if the requested information is not found in the relay data store.

In at least some embodiments, the method can further comprise specifying information in the additional relay data store to prevent dissemination of PIN information for a given user.

In at least some embodiments, the method can further comprise processing messages at the relay site by discriminating between received messages based on message type, the message type including e-mail, PIN and pseudo-PIN, a pseudo-PIN message being a PIN message with at least one e-mail address specified in an address field of the PIN message.

In at least some embodiments, for a given pseudo-PIN message, the method can further comprise: obtaining a PIN address for each e-mail address specified in an address field of the given pseudo-PIN message; converting the given pseudo-PIN message to a standard PIN message; and sending the standard PIN message to recipient mobile devices.

In at least some embodiments, the relay site interacts with an enterprise server, and at the enterprise server the method can further comprise: receiving a given pseudo-PIN message from the given mobile device at the enterprise server; communicating with the relay site to receive corresponding PIN information for each e-mail address specified in an address field of the given pseudo-PIN message; converting the given pseudo-PIN message into a standard PIN message; and sending the standard PIN message to the relay site for distribution to recipient mobile devices.

In at least some embodiments, the method can further comprise informing the given mobile device of located PIN information and storing the located PIN information on the given mobile device.

In at least some embodiments, the method can further comprise generating two or more PIN messages for e-mail addresses that are associated with two or more PIN addresses.

In one aspect, at least one embodiment described herein provides a computer program product for implementing a method of supporting communication of messages between mobile devices associated with a relay site, the computer program product comprising a computer readable medium embodying program code means executable by a processor for carrying out the method as specified above.

The steps of the various processes described herein, as well as some of the structural components, may be provided as executable software instructions stored upon the relay server 306, the mobile device 100, and the enterprise server 272 which may include transmission-type media. Accordingly, as is known by those skilled in the art, the functionality of the processes or the structural features of the various embodiments described herein may be implemented in different ways than those shown here. For instance, some components of the relay server 306 may be combined. Also, some of the components of the host system 250 may be combined. Furthermore, it should be noted that the various modules described herein can be implemented in a variety of ways. In some cases, the modules can be implemented using C++ classes, Java, or another suitable software programming language. Furthermore, the functionality of some of the modules may be combined and provided by one module or by a server. However, such embodiments would still function in a fashion similar to those discussed herein and are therefore still within the scope of the various embodiments described herein as defined in the claims appended hereto.

What is claimed is:

1. A relay site associated with a wireless network for supporting communication of messages between mobile devices associated with the relay site, each of the mobile devices having a Personal Identification Number (PIN) address, wherein the relay site comprises:

a relay data store having relay information for the mobile devices associated with the relay site, the relay information including PIN information, e-mail address information and user information, the PIN information including PIN address information;

a relay server connected to the relay data store, the relay server being adapted to control the operation of the relay site, the relay server comprising a user lookup module for querying the relay data store for PIN information for one or more recipient users specified in a given message; and a network interface connected to the relay server, the network interface being adapted for connecting the relay site to the wireless network, wherein the messages have a message type including e-mail, PIN and pseudo-PIN, and a pseudo-PIN message is a PIN message with at least one e-mail address specified in an address field of the PIN message.

2. The relay site of claim 1, wherein the PIN information further includes PIN date changed information for a given mobile device associated with the relay site.

3. The relay site of claim 2, wherein the relay server is adapted to communicate with an enterprise server for receiving e-mail and PIN address pair information to associate the e-mail address information with the PIN information stored on the relay data store.

4. The relay site of claim 1, wherein the relay server further comprises a message handling module adapted for discriminating between the messages received at the relay site based on the message type, and processing the message based on the message type.

5. The relay site of claim 4, wherein the given message is a given pseudo-PIN message and the message handling module is adapted to interact with the user lookup module to obtain a PIN address for each e-mail address specified in an address field of the given pseudo-PIN message, convert the given pseudo-PIN message to a standard PIN message and send the standard PIN message to recipient mobile devices.

6. The relay site of claim 5, wherein the message handling module is adapted to prevent the conversion based on the identity of the sending user that generated the given pseudo-PIN message.

7. The relay site of claim 5, wherein the relay server is adapted to generate two or more PIN messages for e-mail addresses that are associated with two or more PIN addresses.

8. The relay site of claim 1, wherein the relay site is adapted to interact with an enterprise server and when a given pseudo-PIN message is received at the enterprise server, the enterprise server is adapted to request and receive corresponding PIN information provided by the user lookup module of the relay server for each e-mail address specified in an address field of the given pseudo-PIN message, convert the given pseudo-PIN message into a standard PIN message and send the standard PIN message to the relay site for distribution to recipient mobile devices.

9. The relay site of claim 1, wherein the relay site is adapted to interact with one of the mobile devices to update PIN information stored thereat.

10. The relay site of claim 1, wherein the relay site further comprises a relay bridge to connect the relay site to additional relay sites having additional relay data stores, and the user lookup module is adapted to query at least one of the additional relay data stores when desired PIN information is not located at the relay data store.

11. A mobile communications device comprising:
a main processor that controls the operation of the mobile communications device;
a communication subsystem connected to the main processor, the communication subsystem being adapted to send and receive data including messages; and
a message application that interfaces with the communication subsystem to send and receive the messages; the message application being adapted to allow a user of the mobile communications device to generate a pseudo-PIN message by specifying at least one e-mail address in an address field of a PIN message, and transmit the pseudo-PIN message to an associated relay site.

12. The mobile communications device of claim 11, wherein the mobile communications device further comprises an address book and is adapted to update the address book with PIN information provided by the associated relay site.

13. A wireless network comprising:
a plurality of mobile devices, each of the mobile devices having a Personal Identification Number (PIN) address; and
a relay site associated with the wireless network for supporting communication of messages between the mobile devices, the relay site comprising:
a relay data store having relay information for the mobile devices associated with the relay site, the relay information including PIN information,
a relay server connected to the relay data store, the relay server being adapted to control the operation of the relay site, the relay server comprising a user lookup module for querying the relay data store for PIN information for one or more recipient users specified in a given message, and
a network interface connected to the relay server, the network interface being adapted for connecting the relay site to the wireless network,
wherein each of the mobile communications devices comprises:
a main processor that controls the operation of the mobile communications device;
a communication subsystem connected to the main processor, the communication subsystem being adapted to send and receive data including messages; and
a message application that interfaces with the communication subsystem to send and receive the messages; the message application being adapted to allow a user of the mobile communications device to generate a pseudo-PIN message by specifying at least one e-mail address in an address field of a PIN message, and transmit the pseudo-PIN message to an associated relay site.

14. The wireless network of claim 13, wherein the wireless network further comprises an enterprise server and when a given pseudo-PIN message is received at the enterprise server, the enterprise server is adapted to request and receive corresponding PIN information provided by the relay site for each e-mail address specified in an address field of the given pseudo-PIN message, convert the given pseudo-PIN message into a standard PIN message and send the standard PIN message to the relay site for distribution to recipient mobile devices.

15. A method for supporting communication of messages between mobile devices associated with a relay site, each of the mobile devices having a Personal Identification Number (PIN), the relay site having a relay server, wherein the method comprises:
processing messages at the relay site by discriminating between received messages based on message type, the message type including e-mail, PIN and pseudo-PIN, a pseudo-PIN message being a PIN message with at least one e-mail address specified in an address field of the PIN message;
storing e-mail address information, user information, PIN address information and PIN date changed information at a relay data store for a given mobile device associated with the relay site;
receiving a request at the relay site from a given mobile device for PIN information for a recipient user;
searching the relay data store for the requested PIN information; and
sending search results to the given mobile device,
wherein the relay server communicates with an enterprise server for receiving e-mail and PIN address pair information to associate the e-mail address information with the PIN information stored on the relay data store.

16. The method of claim 15, wherein the method further comprises searching an additional relay data store of an additional relay site if the requested information is not found in the relay data store.

17. The method of claim 15, wherein the method further comprises specifying information to prevent dissemination of PIN information for a given user.

18. The method of claim 15, wherein for a given pseudo-PIN message, the method further comprises:
obtaining a PIN address for each e-mail address specified in an address field of the given pseudo-PIN message;
converting the given pseudo-PIN message to a standard PIN message; and
sending the standard PIN message to recipient mobile devices.

19. The method of claim 18, wherein the method further comprises generating two or more PIN messages for e-mail addresses that are associated with two or more PIN addresses.

20. The method of claim 15, wherein the method further comprises:
receiving a given pseudo-PIN message from the given mobile device at the enterprise server;
communicating with the relay site to receive corresponding PIN information for each e-mail address specified in an address field of the given pseudo-PIN message;
converting the given pseudo-PIN message into a standard PIN message; and
sending the standard PIN message to the relay site for distribution to recipient mobile devices.

21. The method of claim 15, wherein the method further comprises informing the given mobile device of located PIN information and storing the located PIN information on the given mobile device.

22. A computer program product for implementing a method of supporting communication of messages between mobile devices associated with a relay site, each of the mobile devices having a Personal Identification Number (PIN) address, the relay site having a relay server, the computer program product comprising:
a computer readable medium; and
program code means embodied by said computer readable medium, said program code means being executable by a processor for carrying out said method, wherein said method comprises:
processing messages at the relay site by discriminating between received messages based on message type, the message type including e-mail, PIN and pseudo- PIN, a pseudo-PIN message being a PIN message with at least one e-mail address specified in an address field of the PIN message;

storing e-mail address information, user information, PIN address information and PIN date changed information at a relay data store for a given mobile device associated with the relay site;

receiving a request at the relay site from a given mobile device for PIN information for a recipient user, searching the relay data store for the requested PIN information, and sending search results to the given mobile device, wherein the relay server communicates with an enterprise server for receiving e-mail and PIN address pair information to associate the e-mail address information with the PIN information stored on the relay data store.

* * * * *